July 17, 1928.
A. MONTELS
FLY NET FOR HORSES
Filed Aug. 15, 1927
1,677,839
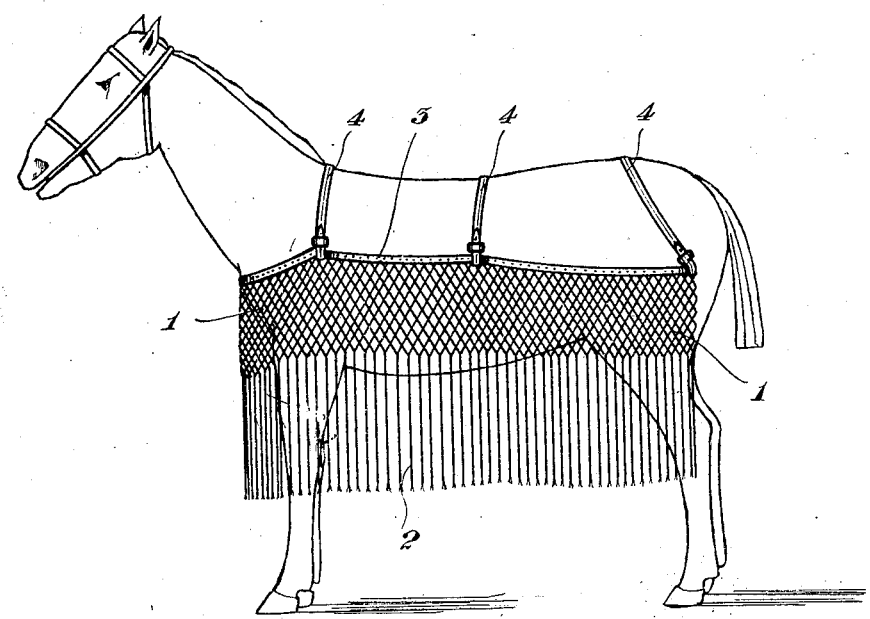
INVENTOR
ADRIEN MONTELS
BY
ATTORNEY Patented July 17, 1928.

1,677,839

UNITED STATES PATENT OFFICE.

ADRIEN MONTELS, OF BUENOS AIRES, ARGENTINA.

FLY NET FOR HORSES.

Application filed August 15, 1927. Serial No. 213,032.

The present invention relates to a network to be applied to four-footed animals and its object is to frighten and prevent flies and other insects from troubling the animals through positioning on them the said network.

According to the present invention, the said arrangement is constituted essentially by a net-work made of hemp or cotton thread or other similar material, which network is strengthened in its upper border by a leather belt or rope made of same material as the network or any other suitable material of the same characteristic features. The said network is positioned around the animal and is fastened on the latter by means of two or more belts which permit regulating the height at which the network is to be positioned.

The said network may be made of a single piece to cover the animal with, except in the back portion, or may be made of two different pieces to be positioned on either side of the animal.

In order that the present invention may be clearly understood and easily performed, same has been shown in its preferred form in the illustrative view accompanying the specification. As will be seen from said figure, a single-piece network is shown which is placed upon an animal in the most suitable way.

Furthermore, the said figure shows that 1ª is the proper network which may carry some threads hanging down, 2 to facilitate the object in view.

3 is the belt or rope intended to strengthen the network and 4 shows the belts by means of which the network is to be fastened on the animal.

It is obvious that various modifications in construction and detail may be introduced without departing from the sphere of the present invention which is clearly ascertained in the clauses and claim hereinafter set forth.

Having particularly described and ascertained the nature of the present invention and in what manner the same is to be performed, I declare that what I claim as being of my invention and exclusive propriety is:

A fly net for horses, comprising a net formed of a comparatively narrow net-work portion, and a plurality of threads depending from the lower edge of the net-work portion, the said threads being of a length greater than the width of the net-work portion, the net being provided at its upper edge with a reinforcing band, and with a plurality of adjustable bands secured to the reinforcing bands and adapted to pass over the back of the horse and hold the net at the sides of the horse.

ADRIEN MONTELS.